(12) United States Patent
Bouwens et al.

(10) Patent No.: US 10,492,388 B2
(45) Date of Patent: *Dec. 3, 2019

(54) PLANT GROWTH SYSTEM

(71) Applicant: Rockwool International A/S, Hedehusene (DK)

(72) Inventors: Paul Jacques Louis Hubert Bouwens, Vught (NL); Eelke Gjalt Hempenius, Deest (NL); Jacob Frank De Groot, Roermond (NL)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 120 days.

This patent is subject to a terminal disclaimer.

(21) Appl. No.: 14/765,036

(22) PCT Filed: Feb. 7, 2014

(86) PCT No.: PCT/EP2014/052487
§ 371 (c)(1),
(2) Date: Jul. 31, 2015

(87) PCT Pub. No.: WO2014/122292
PCT Pub. Date: Aug. 14, 2014

(65) Prior Publication Data
US 2015/0373936 A1 Dec. 31, 2015

(30) Foreign Application Priority Data
Feb. 8, 2013 (EP) ..................................... 13154725

(51) Int. Cl.
*A01G 31/02* (2006.01)
*A01G 7/00* (2006.01)
(Continued)

(52) U.S. Cl.
CPC ............... *A01G 31/02* (2013.01); *A01G 7/00* (2013.01); *A01G 25/16* (2013.01); *A01G 24/18* (2018.02); *Y02P 60/216* (2015.11)

(58) Field of Classification Search
CPC ........ A01G 2031/005; A01G 2031/006; A01G 31/001; A01G 31/02; A01G 7/00; A01G 25/16; A01G 24/18; Y02P 60/216
(Continued)

(56) References Cited

U.S. PATENT DOCUMENTS 5,184,420 A * 2/1993 Papadopoulos ........ A01G 31/00
47/62 N
5,583,080 A * 12/1996 Guldberg ............. A01G 31/001
501/35
(Continued)

FOREIGN PATENT DOCUMENTS

CA 2642183 A1 4/2010
CN 101677514 A 3/2010
(Continued)

OTHER PUBLICATIONS

International Search Report to corresponding Int'l Pat. Appl. No. PCT/EP2014/052487, 3 pages.
(Continued)

*Primary Examiner* — Joshua D Huson
(74) *Attorney, Agent, or Firm* — Tarolli, Sundheim, Covell & Tummino LLP (57) ABSTRACT

A plant growth system is provided, which comprises: one or more plant growth substrates (1); one or more detectors (7) arranged to monitor nutrient levels of at least one of the plant growth substrates; at least one irrigation device (6) arranged to supply water to the plant growth substrates; and control means (9) connected to said detectors and said at least one irrigation device. The supply of water by the at least one
(Continued)

irrigation device is controlled by the control means in dependence on the monitored nutrient levels. In this manner, the water and nutrient levels of the substrates can be accurately controlled.

13 Claims, 7 Drawing Sheets (51) Int. Cl.
*A01G 25/16* (2006.01)
*A01G 24/18* (2018.01)

(58) Field of Classification Search
USPC .............................. 47/59 R, 64, 59 S, 62 N
See application file for complete search history.

(56) References Cited

U.S. PATENT DOCUMENTS

| | | | | |
|---|---|---|---|---|
| 5,590,490 | A * | 1/1997 | Kikuchi | A01G 31/00 47/59 R |
| 5,771,634 | A * | 6/1998 | Fudger | A01G 31/02 47/59 R |
| 6,088,958 | A * | 7/2000 | Oka | A01G 31/02 47/58.1 R |
| 8,044,168 | B2 * | 10/2011 | Gudik-Sorensen | A01G 31/001 442/108 |
| 9,149,005 | B2 * | 10/2015 | Janssen | A01G 31/00 |
| 10,130,050 | B2 * | 11/2018 | Hempenius | A01G 22/00 |
| 2005/0081440 | A1 * | 4/2005 | Sauvage | A01G 31/02 47/62 A |
| 2005/0240313 | A1 | 10/2005 | Cartwright | |
| 2010/0218423 | A1 * | 9/2010 | Walhovd | A01G 31/02 47/62 A |
| 2010/0286833 | A1 * | 11/2010 | Kaprielian | A01C 23/042 700/284 |
| 2010/0289411 | A1 * | 11/2010 | Smits | A01G 7/045 315/113 |
| 2011/0016786 | A1 * | 1/2011 | Cuypers | A01G 31/001 47/59 S |
| 2011/0179711 | A1 * | 7/2011 | Cuypers | A01G 31/001 47/59 S |
| 2011/0258920 | A1 * | 10/2011 | Licamele | A01G 33/00 47/1.4 |
| 2011/0273196 | A1 * | 11/2011 | Hill | A01G 25/167 324/696 |
| 2012/0064508 | A1 * | 3/2012 | Licamele | A01G 33/00 435/3 |
| 2013/0019527 | A1 * | 1/2013 | Howe-Sylvain | A01G 31/06 47/62 A |
| 2013/0055634 | A1 * | 3/2013 | Daniely | A01G 25/167 47/48.5 |
| 2014/0101996 | A1 * | 4/2014 | Hempenius | A01G 22/00 47/58.1 R |
| 2015/0027052 | A1 * | 1/2015 | Janssen | A01G 24/18 47/59 S |
| 2015/0052809 | A1 * | 2/2015 | Janssen | A01G 31/00 47/79 |
| 2015/0128492 | A1 * | 5/2015 | De Kubber | A01G 31/00 47/65.5 |
| 2015/0216132 | A1 * | 8/2015 | Hempenius | A01G 31/00 47/65.5 |

FOREIGN PATENT DOCUMENTS

| | | |
|---|---|---|
| CN | 102056476 A | 5/2011 |
| CN | 102150577 A | 8/2011 |
| CN | 202617890 U | 12/2012 |
| EP | 0300536 | 1/1989 |
| EP | 1897433 | 3/2008 |
| EP | 2111746 | 10/2009 |
| JP | H01104119A A | 4/1989 |
| JP | 09271278 | 10/1997 |
| JP | H11146737A A | 6/1999 |
| JP | 2005117999 A | 5/2005 |
| JP | 2006527356 A | 11/2006 |
| WO | 9213441 A1 | 8/1992 |
| WO | 03005807 | 1/2003 |
| WO | 2004109238 | 12/2004 |
| WO | 2010031773 | 3/2010 |
| WO | WO-2013093081 A1 * | 6/2013 ............ A01G 22/00 |

OTHER PUBLICATIONS

Office Action to corresponding AU Appl. 2014213971, dated Nov. 11, 2016, pp. 1-3.
Office Action to corresponding CN Appl. 2014800079454, dated Dec. 2, 2016, pp. 1-10.
Office Action to corresponding CN Appl. 2014800079454, dated Jul. 4, 2017, pp. 1-11.
Lee Shi Jun et al., Facilities Horticulture, China Agricultural Publishing House 2nd ed., pp. 342-343.
Office Action to corresponding JP Appl. 2015-556517, dated Jun. 13, 2017, pp. 1-7.

* cited by examiner

PLANT GROWTH SYSTEM

FIELD OF THE INVENTION

The present invention relates to the growth of plants in artificial substrates. In particular, but not exclusively, the present invention relates to the growth of plants in mineral wool substrates.

BACKGROUND TO THE INVENTION

It is known that plants can be grown in mineral wool growth substrates. Such growth substrates are typically provided as a coherent plug, block, slab or mat/blanket and generally include a binder, usually an organic binder, in order to provide structural integrity to the product.

Typically, the growth process of the plant is managed in two stages: a first stage managed by a "propagator" in which the plant is grown from seed; and a second stage managed by a "grower" during which the plant is sustained and any harvest taken. For example, in the case of the tomato plant, the propagator may plant individual tomato seeds in cylindrical plugs having a thickness in the order of 25-30 mm and a radius of around 20-30 mm. After germination of the seed, the propagator places the plug within a cuboid block to allow further growth of the root system and the plant. The individual plant within the block is then nursed until a stage when it can be transferred from the propagator to the grower.

Although often only a single plant is provided in each block, it is possible for multiple plants to be provided in a single block. In some examples, a single plant in a block is split into two by splitting a stem during an early phase of growth, resulting in two plants sharing a single root system. In another alternative, multiple plants may be grafted together and grown within a single block.

The use of a separate plug and block by the propagator is not essential for all plants, but has been described, for example, in European patent application EP2111746, as providing a number of advantages. In particular, the small size of the plug allows more regular watering of the plant in the initial stage without saturating its substrate.

After they are received from the propagator, the grower places a number of blocks on a single slab of mineral wool to form a plant growth system. The slab of mineral wool is typically encased in a foil or other liquid impermeable layer except for openings on an upper surface for receiving the blocks with the plants and a drain hole provided on the bottom surface.

During subsequent growth of the plant, water and nutrients are provided using drippers which deliver a liquid containing water and nutrients to the system either directly to the blocks or to the slabs. The water and nutrients in the blocks and slabs is taken up by the roots of the plants and the plants grow accordingly. Water and nutrients which are not taken up by the plant either remain in the substrate system or are drained through the drain hole.

There is a desire to use water and nutrients as efficiently as possible during the growing process. This is both for cost and environmental reasons. In particular, the nutrients are expensive to obtain, while waste water containing such nutrients is difficult to dispose of due to environmental legislation. These pressures will increase as raw materials (particularly fertilisers such as phosphates) become increasingly scarce. The desire to avoid such waste is matched by a desire to improve plant growth conditions, and thereby to increase the yield and quality of fruit obtained from plants in this manner.

The use of mineral wool itself provides significant benefits in this regard as compared to traditional soil-based growing methods, but there is an ongoing requirement to further improve these characteristics. In particular, there is a conflicting desire to both produce more and consume less in plant growth processes. That is, a greater yield from the plants is desired while at the same time reducing the amount of water and/or nutrients that are used. In practice, existing growing methods and/or substrates provide limitations on both these aspects.

Important qualities of plant growth systems in this context include their water retention, re-saturation and water/nutrient distribution. The water retention reflects the quantity of water that can be retained by the system while the water distribution reflects the location within the slab of the water and nutrients that are present. The re-saturation refers to the tendency of newly added liquid solution to add to the water and nutrient levels of the substrate rather than replace existing solution or be spilled.

Particular considerations which affect water retention, water distribution and re-saturation include the effect of gravity, which tends to force water downwards and thus towards the drain hole, and capillary effects which can cause water to be drawn upwards. In practice, the slabs are typically provided on a slight slope, with the drain hole located at the lowest end of the bottom surface, helping to ensure that gravity forces the water towards the drain hole. In addition to gravity and capillary effects, the flow resistance of the medium should be considered, which has the effect of preventing water passing through the slab from the drippers to the drain hole. Overall, if root and plant development is to be optimised, then it is necessary to ensure that optimal conditions are found in the region of the substrate in which the roots are growing.

As would be expected, sub-optimal water retention in the substrate can lead to either a shortage or an excess of water. In the case of shortage, this leads to water being lost, and thus wasted, through the drain hole. The water distribution is also important since it is necessary for the water within the slab to reach the plant roots. For example, when a plant has recently been placed on the slab, the roots will extend slowly into the upper regions of the slab. If water fails to reach the roots, this will result in loss of growth speed and thus loss in production. In particular, in order to ensure that the plant roots in the top region of the slab are sufficiently watered, it may be necessary for the grower to provide excessive water to the slab to maintain sufficient water around the roots, leading to greater wastage through the drain hole and extra costs. Excessive water levels can also increase the risk of fungal growth on one hand or oxygen depletion on the other which may damage the plant.

An important factor in plant growth is the retention and distribution of nutrients. Although the nutrients are typically introduced with the water, they will not necessarily be distributed and retained by the slab in the same way. The nutrients typically comprise dissolved salts comprising nitrogen, phosphorus, potassium, calcium, magnesium and similar elements. The nutrients are dissolved in the water and their movement through the slab is affected by processes such as advection, dispersion and diffusion. Advection is the movement of nutrients with the water flow through the slab, dispersion is the mixing of nutrients that occurs as they travel through complex pore structures in the slab, and diffusion relates to random movement of particles within the slab and the statistical tendency this has to reduce concentration gradients.

As with the water itself, it is important that the nutrients reach the plant roots. If nutrients are poorly distributed, or are lost from the slab, then excess nutrients may be required in the slab as a whole for the plant to receive the nutrients it requires. This is, of course, a waste of nutrients.

Another consideration that plays a role in plant growth on man made substrates is the nutrient refreshment efficiency (i.e. irrigation efficiency to refresh nutrients). This relates to whether the introduction of new nutrient solution will flush out existing nutrients in the slab. In some circumstances, it may be desirable to change the nutrient concentration within the slab during the growth process. The ability to do this will depend on whether existing nutrients can effectively be replaced through the whole slab or at least the region of the slab in which root growth takes place. Moreover, in some examples a build up of nutrients if they are not replaced can reach levels which can cause dehydration or are at least non-ideal for plant growth.

In view of this, it is recognised that the amount of water and nutrients provided to a plant plays a critical role in plant growth. This choice is typically made by analysing external factors, such as hours of sunshine or temperature and inferring the likely behaviour of the system (in terms of evaporation etc.). Whilst it is possible in green houses, for example, to control factors such as radiation by using screen and temperature by using heating systems, such systems are expensive to run and it is desirable to control the amount of water and nutrients in a manner that maximises energy savings.

It is known to measure the water and/or nutrient content within a plant growth substrate. For example, international patent application WO 2010/031773 describes a water content measuring device which determines the water content of a mineral wool substrate by measurement of a capacitance. Similarly, international patent application WO 03/005807 describes a process for measuring the oxygen level in the water in a plant growth substrate. However, although such techniques can provide useful information to the grower, they do not in of themselves ensure improved water, nutrient and oxygen content and distribution within the slab.

There is a continuing requirement to improve the irrigation of plants during plant growth. Existing techniques often result in the loss and/or overfeeding of water and/or nutrients as they are unable to offer suitable control of such properties.

For example, US 2005/0240313 and EP0300536 each describe irrigation systems including an irrigation device adapted to lower or raise the water content, so that the water content can be set to a fixed level. One disadvantage of such systems is that the EC level, and therefore nutrient level, is not suitably controlled in a timely manner. Lowering or raising water content in the known devices does not change the EC level. The EC level might change, but only if nutrient solution is added to the water.

WO 2004/109238 describes an irrigation system which takes measurements of water and nutrient levels going into the system, wherein the measurements are not taken directly on the slab. In the control unit of this system, the amount of water in the system is indicated. The EC level is inferred base on an assumption made in view of the measured amount of water.

SUMMARY OF THE INVENTION

According to a first aspect of the present invention, there is provided a plant growth system comprising:
one or more plant growth substrates;
one or more detectors arranged to monitor nutrient levels of at least one of the plant growth substrates;
at least one irrigation device arranged to supply water to the plant growth substrates; and
control means connected to said detectors and said at least one irrigation device,
wherein the supply of water by the at least one irrigation device is controlled by the control means in dependence on the monitored nutrient levels.

In the present invention, the nutrient level is used to control the quantity of water provided to the substrates. This reflects a recognition that, at least at times, the water content level should not be maintained at a certain point if it has a detrimental effect on nutrient level. For example, when a deliberate effort is undertaken to reduce the water content level within a substrate, there is a risk that an increased nutrient level will result. It has therefore been recognised as inappropriate to ignore nutrient level when enacting control of the water content level.

In contrast to the existing devices described above (e.g. with reference to EP0300536), with the present system it is possible to measure the EC level and decide whether it requires lowering or raising. Based on the decision taken, irrigation is stopped or applied in order to change the EC level and thereby accurately control the nutrient level. Known devices such as the ADS system of EP0300536 are arranged to adapt water content (as opposed to nutrient level). As a consequence of adapting water content, it is possible that the EC level might change, however this is not determined accurately and thus the nutrient content is not determined in an appropriate manner. In contrast, the present invention is directed at controlling the EC level and, as a consequence, water content will be changed in an appropriate manner.

The present invention can therefore provide a feedback system that can be used to closely and reliably monitor the nutrient level in the slab and control the applied water in dependence on this level. The nutrient levels in the one or more substrates are monitored directly. For example, by taking measurements within the substrate rather than indirectly by measurement of water drained from the substrate or some other technique. This provides a system in which the environment of each plant can be controlled to provide the maximum outcome for a given supply of water and/or nutrients.

Rather than relying upon incident radiation levels, as in conventional, the present invention uses the nutrient level in the substrate—and may also use the water content in the substrate—as critical set points in decision making for irrigation. In traditional cases, more incident light automatically leads to more irrigation. In contrast, the present invention allows a decision on whether to irrigate or not to be based not on the light level, or at least not only on the light level, but on direct measurement of the substrate.

The substrates are preferably MMVF substrates, although other substrates may be used. In preferred embodiments, each substrate comprises a slab and a single block (preferably an MMVF slab and a single MMVF block). That is, one and only one plant-containing block is provided on each slab, meaning that the control of the water and/or nutrient content within each slab can be much more accurately managed than in systems where plants are provided in multiple blocks which may compete for resources from the slab. It is recognised that the use of a single block allows a feedback system which can more accurately measure the relevant nutrient level and therefore provide more accurate control of the applied water and nutrients in dependence on these characteristics.

Preferably, the one or more detectors are further arranged to monitor water content levels of at least one of the plant growth substrates, and the supply of water by the at least one irrigation device is controlled by the control means in dependence on the monitored water content levels. In this manner, the water supply is accurately controlled based on both the nutrient levels and the water content levels actually observed in the substrates.

In addition to control of the supply of water by the at least one irrigation device, the control means may also control the supply of nutrients by the at least one irrigation device. Such control may be enacted in dependence on the measured water content and/or nutrient levels.

In preferred embodiments, the one or more detectors are further arranged to monitor the distribution of at least one of: water and/or nutrients within at least one of the plant growth substrates. Preferably, the supply of water and/or nutrients is controlled so as to increase uniformity of the monitored water, nutrient and/or oxygen distribution. Thus, not only is the quantity of such materials known, but so is information about how they are distributed within and/or between the block and/or slab of a given system. This provides an extra layer of detail that can be utilised to ensure that appropriate water and nutrients are provided.

The benefits of improved distribution of water and/or nutrients are particularly significant during an early stage when a plant-containing block is newly placed on the slab. At this point it is important that the first layer contains enough water and nutrients to secure a good rooting within the slab. This allows positive root development to secure optimal and healthy plant growth. Beneficially, not only does the slab of the present invention allow sufficient water and nutrients to be provided, but it also allows the level water and nutrients in the vicinity of the roots to be closely controlled. This can help to avoid over-feeding the plant which can reduce the growth of fruit and/or vegetables.

The man made vitreous fibres (MMVF) of the present invention may be fibre glass, mineral wool or refractory ceramic fibres. In preferred embodiments, the MMVF is mineral wool.

The one or more detectors may be fixed relative to the substrates. That is to say, the one or more detectors may be permanently in position and thus do not need to be re-mounted each time water or nutrient levels are monitored. In the context of single blocks on each slab it can be understood that this permanence to the control system can be established. In particular, automated control of plants and/or nutrients can be used to provide the ideal levels to each plant within the system.

The nutrient level may reflect the overall level of all nutrients in the substrate, the levels of some particular nutrients, or the level of a single nutrient. The present invention is not limited to any one implementation in this regard.

The one or more detectors may be arranged to regularly monitor the water and/or nutrient content of at least one of the plant growth substrates. For example, these levels may be monitored at regular intervals. In an alternative, the one or more detectors may be arranged to measure the water and/or nutrient content continuously.

Preferably, the one or more detectors are arranged to monitor both the water and nutrient content of at least one of the plant growth substrates.

In some preferred embodiments, the one or more detectors are further arranged to monitor the temperature of at least one of the plant growth substrates, and the supply of water and/or nutrients by the at least one irrigation device is further controlled by the control means in dependence on the monitored temperature.

Preferably, the one or more detectors are arranged to determine the nutrient content from an electrical conductivity (EC) of fluid in or drained from at least one plant growth substrate. The electrical conductivity provides an accurate indication or the number of salts, and thus ions, in a fluid. This provides a good indication of the nutrient level. In particular, the one or more detectors are arranged to maintain the electrical conductivity within a predetermined range. Advantageously, with the present invention it is possible for a user to set a preferred EC level ("target") value and to supply water and nutrients based on this value. In other words, with the present invention it is possible to "steer" the EC level so that the nutrients level is controlled in a timely manner.

Preferably, the two or more detectors are arranged to extend through a side wall of the slab such that, in use, the nutrient levels are monitored at different heights of the slab. In this way it is possible to obtain vertical measurements of the EC and account for EC variations over the height of the slab in order to provide more accurate values of the EC level and thus nutrient content.

In preferred embodiments, the slab has a volume in the range of 3 to 20 litres. Preferably, the slab has a volume of 5 to 15 litres, more preferably 5 to 11 litres, and in a particular preferred embodiment the slab has a volume of 6 to 8 litres. Such a relatively small volume allows close control of water and nutrient levels without being so small as to prevent desired root growth.

The size of the slab also allows more effective control of water and nutrient levels compared to conventional, larger slabs. Unlike previous slabs, which are typically designed to receive multiple plant-containing blocks on an upper surface, the slab of the present invention is in preferred embodiments arranged for use with a single plant-containing block. In this way, the water and nutrients provided to an individual plant, or plants from an individual block, may be closely managed. This allows the level of water and nutrients provided to the plant to be optimised, in particular for generative growth strategies that offer a greater yield and less waste than vegetative strategies.

In some preferred embodiments, each plant growth substrate further comprises a single MMVF plug disposed within the MMVF block. The plug can be used to grow the plant from seed before being engaged with the block.

Preferably, the MMVF slab comprises a first layer of MMVF in interfacial contact with a second layer of MMVF, the first layer having a greater density than the second layer. The provision of separate densities has been found to increase control over the distribution of water and nutrients in the substrate. In preferred embodiments, the first layer of MMVF has a density in the range 40 $kg/m^3$ to 90 $kg/m^3$ and the second layer of MMVF has a density in the range 35 $kg/m^3$ to 85 $kg/m^3$. More preferably, the density of the first layer is in the range 50 $kg/m^3$ to 80 $kg/m^3$ and/or the density of the second layer is in the range 45 $kg/m^3$ to 75 $kg/m^3$. In a particularly preferred embodiment, the density of the first layer is 70 $kg/m^3$ and the density of the second layer is 50 $kg/m^3$. These densities are found to offer good properties for plant growth, including water and nutrient retention.

The density of the second layer is less than that of the first layer. Preferably, the density of the second layer is at least 5 kg/m³ less than that of the first layer, more preferably at least 10 kg/m³, and most preferably around 20 kg/m³. This contrast between the densities of the layers assists in ensuring that water and nutrients are suitably distributed through the slab, and in particular can help to avoid an excessive proportion of water and/or nutrients being found in the second layer.

In preferred embodiments, the substrate comprises a hydrophilic binding system and/or a binding system comprising an organic binder selected from formaldehyde free binders. The binding system may comprise the binder and a wetting agent, or may comprise the binder alone. By ensuring that the binding system is hydrophilic, the water retention properties of the slab can be improved relative to binding systems which are non-hydrophilic or hydrophobic.

Preferably, the binder comprises the reaction product of a polycarboxylic acid component and a polyol and/or an amine component, preferably in admixture with a sugar component and/or a phenol. More preferably, the binder is a reaction product of a polycarboxylic acid or anhydride thereof, an amine, preferably an alkanolamine, and a sugar, preferably a reducing sugar. These binders are found to offer particularly advantageous properties in MMVF slabs.

The wetting agent can be a non-ionic surfactant but preferably comprises an ionic surfactant distributed in one or both said layers. Preferably, the surfactant is an anionic surfactant, preferably a sulphonate surfactant, preferably linear alkyl benzene sulphonate (LABS). These preferred wetting agents have been found to offer beneficial effects, particularly improving the hydrophilicity of the binder system.

The MMVF block is preferably provided in contact with the first layer. Moreover, the first layer is preferably above the second layer in use. Furthermore, water and nutrients are preferably provided to the block or to the first layer. In this way, water and nutrients may be received in the first, more dense layer. This has been found to offer good water retention and distribution properties.

In preferred embodiments, the thickness of the first layer is less than the thickness of the second layer. In preferred embodiments, a ratio of first layer thickness to second layer thickness is in the range 1:(1-3), preferably 1:(1.2-2.5), more preferably 1:(1.2-1.8). For example, the thickness of the first layer may be half the thickness of the second layer or more. The preferred relative thicknesses of the first and second layers are found to offer close control of the water and nutrient retention throughout the substrate.

In preferred embodiments the block has a volume in the range of 50 ml-5000 ml and/or each block a density in the range of 30 kg/m³-150 kg/m³. These sizes and densities have been found to be effective for use in plant growth systems.

In preferred embodiments, the thickness of the first layer is less than the thickness of the second layer. Preferably, the thickness of the first layer is at least half the thickness of the second layer. These proportions are found to assist in maintaining a preferred distribution of water and nutrients in the slab.

In preferred embodiments, the predominant fibre orientation of the first and second layers is horizontal. In this context, horizontal means parallel to the interfacial contact between the first and second layers. In other preferred embodiments, the predominant fibre orientation of one or both of the first and second layers is vertical (i.e. perpendicular to the interfacial contact). For example, in a particularly preferred embodiment, the predominant fibre orientation of the first layer is vertical while the predominant fibre orientation of the second layer is horizontal. In an alternative embodiment, the predominant fibre orientation of the first layer may be horizontal while the predominant fibre orientation of the second layer is vertical. The fibre orientations can affect the flow speed of liquid through the slab. For example, horizontal fibre orientations can reduce the flow speed of liquid through the slab and have a consequent beneficial effect on the amount of liquid that is spilled.

BRIEF DESCRIPTION OF THE DRAWINGS

Preferred embodiments of the present invention will now be described with reference to the accompanying drawings, in which.

DETAILED DESCRIPTION

Figure 1:
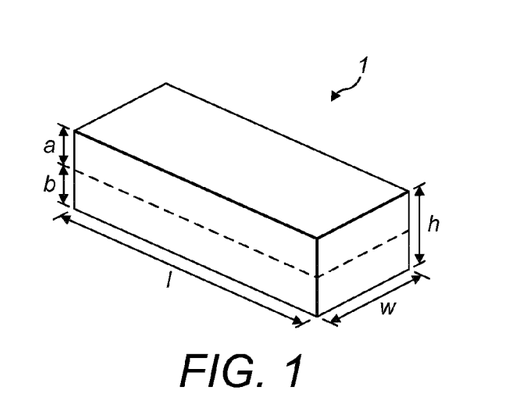
FIG. 1 illustrates a slab used for plant growth in accordance with a preferred embodiment of the present invention.

Referring to FIG. 1, there is shown a mineral wool slab 1 having a first layer of a first density disposed above a second layer of a second density. The slab 1 has a volume of 6.8 litres, although more generally for preferred embodiments the volume may be in the range of 3 litres to 20 litres, more preferably in the range 5 litres to 15 litres, and most preferably in the range 5 to 11 litres. Some embodiments comprise a slab with a volume in the range 6 litres to 8 litres. In other embodiments, the volume may lie in the range of 3 litres to 15 litres, or 3 litres to 10 litres, for example. An alternative preferred embodiment comprises a slab having a volume of 9 litres.

The height h of the slab 1 of FIG. 1 is 100 mm, although more generally it may lie between 75 mm to 150 mm and more preferably between 85 mm and 125 mm. The width w of the slab 1 is 150 mm, although this may more generally lie in the range of 100 mm to 300 mm, for example. The length l of the slab 1 is 450 mm, although this value may also be varied, and may, for example, lie in the range of 200 mm to 800 mm, or preferably in the range 250 mm to 600 mm. A particular preferred embodiment comprises a slab 1 having a height h of 100 mm, a width w of 150 mm and a length l of 600 mm.

In the preferred embodiment shown in FIG. 1, the first layer has a height a of 40 mm and a density of 70 kg/m³ while the second layer has a height b of 60 mm and a density of 50 kg/m³. Again, in other preferred embodiments different values of these parameters may be chosen. For example, the height a of the first layer may lie in the range of 25 mm to 50 mm, while the height of the bottom layer may lie in the range of 50 mm to 100 mm. Similarly, the density of the top layer is preferably in the range of 40 kg/m$^3$ to 90 kg/m$^3$, more preferably 50 kg/m$^3$ to 80 kg/m$^3$, while the density of the bottom layer is preferably in the range of 35 kg/m$^3$ to 85 kg/m$^3$, more preferably 45 kg/m$^3$ to 75 kg/m$^3$.

As is the case in the embodiment shown in FIG. 1, it is preferable that the height of the bottom layer is greater than that of the top layer. For example, the ratios between the heights of the top and bottom layers may be 1:(1-3), or preferably 1:(1.2-2.5). More preferably, this ratio is 1:(1.2-1.8).

The use of two differing densities in the slab of the preferred embodiment, together with its relatively small size, have been found to assist in the retention of water and nutrients and also ensuring that these are distributed substantially uniformly throughout the slab.

Figure 2:
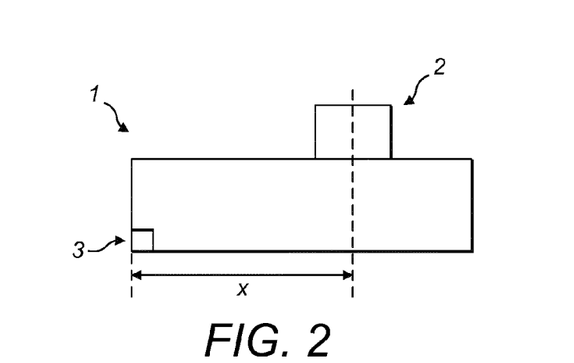
FIG. 2 illustrates a plant growth system comprising a block together with the slab of FIG. 1.

Referring now to FIG. 2, the slab 1 is shown with a block 2 positioned on its upper surface. The slab 1 further comprises a liquid impermeable covering around the mineral wool, the covering having two openings. Firstly, there is an opening on the upper surface to allow contact between the mineral wool of the slab 1 and the block 2. Secondly, there is an opening on a lower surface which acts as a drain hole 3.

As can be seen in FIG. 2, the slab 1 is associated with only a single block 2 (i.e. one and only one block) for containing plants. In this way, the environment of the plant or plants in a single block 2 can be directly managed more effectively. This contrasts with previous systems in which a plurality of blocks 2 is provided on each slab 1. In particular, this avoids interference between plants from different blocks 2 and consequent inconsistency in water or nutrient supplies to such plants.

Whereas the block 2 is provided on an upper surface of the slab 1, the drain hole 3 is provided at or adjacent to an edge of a lower surface of the slab 1. The position of the block 2 as measured from its central point is preferably offset from that of the drain hole 3 by a distance x along the lengthy of the slab 1. The distance x is preferably greater than 50% of the length l of the slab 1, more preferably greater than 60% of this length, and may be greater than 70% of this length, although most preferably it is between 65% and 70%. In the particular preferred embodiment shown in FIG. 2, the block 2 is offset from the position of the drain hole 3 by around 66.7% of the length of the slab. Specifically, the length l of the slab 1 is 450 mm, while the block 2 is placed at a distance of 300 mm from the end of the slab 1 on which the drain hole 3 is disposed. By increasing the distance between the block 2 and the drain hole 3, the path length of solution comprising water and nutrients provided to or adjacent to the block is increased. This is found to provide benefits in terms of the nutrient refreshment efficiency of the slab 1.

The block 2 and the slab 1 are preferably formed of the same or a similar material. Thus the description below regarding the material of the slab 1 may equally be applied to the block 2. In particular, the block 2 may comprise stone wool and the binders and/or wetting agents described below. In the preferred embodiment, the block 2 has a volume of 1200 ml. More generally the block may have a volume in the range of 50 ml to 5000 ml, more preferably 100 ml to 3500 ml, more preferably 250 ml to 2500 ml, and most preferably 100 ml to 2000 ml. The overall volume of the combination of the slab 1 and block 2 is preferably in the range of 6 to 11 litres.

The block dimensions can be chosen in dependent on the plant to be grown. For example, the preferred length and width of a block for pepper or cucumber plants is 10 cm. For tomato plants, the length is increased to 15 cm. The height of the blocks is preferably in the range of 7 to 12 cm, and more preferably in the range of 8 to 10 cm.

Therefore, preferred dimensions for pepper and cucumber range from 10 cm*10 cm*7 cm to 10 cm*10 cm*12 cm, and more preferably from 10 cm*10 cm*8 cm to 10 cm*10 cm*10 cm. In terms of volume, therefore, the preferred range is 0.7 litres to 1.2 litres, more preferably 0.8 litres to 1 litre for cucumber and pepper plants. For tomato plants, the preferred dimensions range from 10 cm*15 cm*7 cm to 10 cm*15 cm*12 cm, and more preferably from 10 cm*15 cm*8 cm to 10 cm*15 cm*10 cm. In terms of volume, therefore, the preferred range is 1.05 litres to 1.8 litres, more preferably 1.2 litres to 1.5 litres for tomato plants. The overall range of volumes for these crops is therefore preferably 0.7 litres to 1.8 litres, and more preferably 0.8 litres to 1.5 litres.

The density of the block 2 is preferably in the range of 30 kg/m$^3$ to 150 kg/m$^3$, more preferably in the range of 40 kg/m$^3$ to 120 kg/m$^3$, and most preferably in the range of 50 kg/m$^3$ to 100 kg/m$^3$. The height of a block 2 is preferably in the range 50 mm to 160 mm, more preferably in the range 60 mm to 125 mm and most preferably in the range 80 mm to 100 mm. The length and width of the block 2 may independently vary in the range 50 mm to 250 mm, preferably in the range 60 mm to 200 mm, and most preferably in the range 70 mm to 150 mm. These sizes and densities have been found to be effective for use in plant growth systems.

Figure 3:
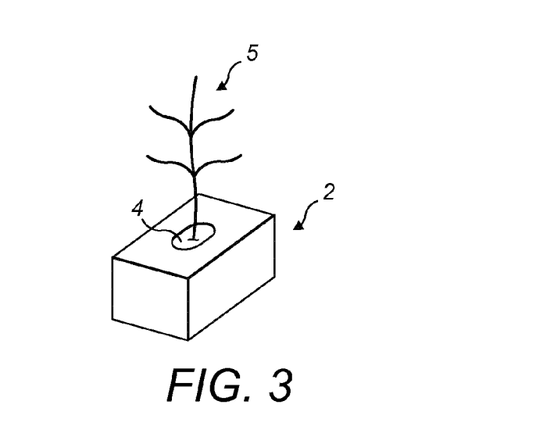
FIG. 3 illustrates the block of FIG. 2 together with a plug and a plant.

FIG. 3 illustrates a plant 5 in position within a plug 4 disposed within a block 2, such as that shown in FIG. 2. Like the block 2, the plug 4 is typically formed of a mineral wool with a binder and/or wetting agent as described below in the context of the slab 1. The plug 4 is preferably cylindrical with a diameter of 20 mm to 50 mm, preferably 20 mm to 40 mm, and a height of 20 mm to 50 mm, preferably 25 mm to 35 mm.

Each block 2 may in a preferred embodiment contain a single plant 5. However, it is possible that multiple plants 5 may be provided for each block 2, either by providing multiple plugs 4 each containing a single plant 5 or providing multiple plants in a single plug 4. In other preferred embodiments, a single plant is divided into two by splitting the stem of the plant at an early stage of growth.

In some embodiments, the plug 4 is not provided, and the seed is disposed directly within a hole in the block, from which the plant 5 subsequently grows. An example of a plant for which this approach is taken is the cucumber.

Preferably, the plant 5 is fruit or vegetable plant, such as a tomato plant or the like. In other preferred embodiments, the plant is a cucumber, aubergine or sweet pepper plant. The preferred embodiments of the present invention can increase the yield of fruit or vegetables from a plant and may also increase the quality of that fruit or vegetable.

As mentioned above, the slab 1 is a mineral wool slab. The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

The mineral wool is typically bound by a binding system which comprises a binder composition and additionally a wetting agent. In the preferred embodiment, the slab comprises mineral wool bound by a binder composition which, prior to curing, comprises: a) a sugar component, and b) a reaction product of a polycarboxylic acid component and an alkanolamine component, wherein the binder composition prior to curing contains at least 42% by weight of the sugar component based on the total weight (dry matter) of the binder components.

This composition is included in the mineral wool which is to be used for the slab 1 and then cured, so that in the slab shown in FIG. 1 the composition has been cured and so the components will have reacted. Thus the slab contains a cured binder obtained by curing of the defined binder composition containing components (a) and (b) and the components of the binder composition discussed below refer to the composition prior to curing.

The sugar component (a) employed in accordance with the present invention is preferably selected from sucrose and reducing sugars or mixtures thereof.

A reducing sugar is any sugar that, in solution, has an aldehyde or a ketone group which allows the sugar to act as a reducing agent. In accordance with the present invention, reducing sugars may be present in the uncured binder composition as such or as a carbohydrate compound that yields one or more reducing sugars in situ under thermal curing conditions. The sugar or carbohydrate compound may be monosaccharide in its aldose or ketose form, a disaccharide, a triose, a tetrose, a pentose, a hexose, or a heptose; or a di-, oligo- or polysaccharide; or combinations thereof. Specific examples are glucose (i.e. dextrose), starch hydrolysates such as corn syrup, arabinose, xylose, ribose, galactose, mannose, frustose, maltose, lactose and invert sugar. Component (b) essentially comprises a reaction product of a polycarboxylic acid component and an alkanolamine component.

Preferably the alkanolamine component is selected from diethanolamine, triethanolamine, diisopropanolamine, triisopropanolamine, methyldiethanolamine, ethyldiethanolamine, n-butyldiethanolamine, methyldiisopropanolamine, ethyl-isopropanolamine, ethyldiisopropanolamine, 3-amino-1,2-propanediol, 2-amino-1,3-propanediol and tris(hydroxymethyl)aminomethane. Most preferably the alkanolamine component is diethanolamine.

In the binder composition which is used in the products of the invention it is preferred to have the reaction product (b). However, in practice there is usually also some unreacted alkanolamine component present in the uncured binder composition.

The polycarboxylic acid component is generally selected from dicarboxylic, tricarboxylic, tetracarboxylic, pentacarboxylic, and like polycarboxylic acids, and anhydrides, salts and combinations thereof.

Preferred polycarboxylic acid components employed as starting materials for reacting with the other binder components are carboxylic anhydrides.

In the binder composition which is used in the products of the invention it is preferred to have the reaction product (b). However, in practice there is usually also some unreacted polycarboxylic acid component present in the uncured binder composition.

In order to improve the water solubility and dilutability of the binder, a base may be added up to a pH of about 8, preferably a pH of between about 5-8, and more preferably a pH of about 6. Furthermore, the addition of a base will cause at least partial neutralisation of unreacted acids and a concomitant reduction of corrosiveness. Normally, the base will be added in an amount sufficient to achieve the desired water solubility or dilutability. The base is preferably selected from volatile bases which will evaporate at or below curing temperature and hence will not influence curing. Specific examples of suitable bases are ammonia ($NH_3$) and organic amines such as diethanolamine (DEA) and triethanolamine (TEA). The base is preferably added to the reaction mixture after the reaction between the alkanolamine and the carboxylic anhydride has been active stopped by adding water.

An alternative binder composition may be based on a furan resin. Such a furanic binder composition is described in European patent EP0849987. The furanic binder composition is both formaldehyde-free and hydrophilic, thereby offering particular advantages in the context of the present invention.

Although preferred embodiments of the invention use a formaldehyde-free binder, binder systems comprising phenol-formaldehyde (PF), or particularly phenol-urea-formaldehyde (PUF), with or without dextrose may also be used where appropriate. These may include Ultra Low Formaldehyde (ULF) binders.

As mentioned above, the binding system preferably comprises a wetting agent. This can be a non-ionic surfactant but preferably the wetting agent is an ionic surfactant. By using the binder described above, the wetting agent is not essential to provide a hydrophilic binder system. Accordingly, adequate water retention and re-saturation properties may be achieved without the wetting agent. However, the use of a wetting agent is preferred as it is found to increase the speed at which the slab may become saturated.

Preferably, the wetting agent is an anionic surfactant. Suitable anionic surfactants include salts (including, for example, sodium, potassium, ammonium and substituted ammonium salts such as mono-, di- and triethanolamine salts) of the anionic sulphate, sulphonate, carboxylate and sarcosinate surfactants. Other anionic surfactants include isethionates such as the acyl isethionates, N-acyl taurates, fatty acid amines of methyl tauride, alkyl succinates and sulfosuccinates, mono esters of sulfosuccinates, di-esters of sulfosuccinates and N-acyl sarcosinates. Preferred are anionic sulphate surfactants and anionic sulphonate surfactants, anionic carboxylate surfactants and anionic soap surfactants.

Particularly preferred are the anionic sulphonate surfactants such as linear or branched alkyl benzene sulphonates, alkyl ester sulphonates, primary or secondary alkylene sulphonates, olefin sulphonates, sulphonated polycarboxylic acids, alkyl glycerol sulphonates, fatty acyl glycerol sulphonates, fatty oleyl glycerol sulphonates and mixtures thereof.

Most preferably the anionic surfactant is a linear alkyl benzene sulphonate in which the alkyl chain has from 5 to 20 carbon atoms. The sodium and potassium salts are preferred. This type of surfactant provides particularly beneficial water distribution properties for growth substrates of relatively large height and also provides excellent re-saturation properties and does not lead to foaming problems in the irrigation water. Conventional non-ionic surfactants allow the growth substrate to take up water, but their water retaining capacity, water distribution over height and re-wetting properties are not as good as with this type of surfactant, preferred in the invention.

Preferably the alkyl chain length is in the range 8 to 16, and more preferably at least 90% of the chains are in the range 10 to 13 and more preferably at least 90% (by weight) are in the range 10 to 12.

Preferably the wetting agent comprises a linear alkyl benzene sulphonate and in this case the product is preferably produced by a method in which a polyol (such as monoethylene glycol) is included with the wetting agent in the mineral fibre product. The weight ratio of linear alkyl benzene sulphonate to monoethylene glycol (or other polyol—for instance propylene glycol or trimethylolpropane) is preferably 0.3:1 to 3.75:1, preferably 1:1 to 2:1. The polyol is normally evaporated during subsequent processing and curing and thus usually only trace amounts, if any, are present in the final product.

Alternatively, the ionic surfactant may be cationic or zwitterionic. Examples of cationic surfactants include quaternary ammonium surfactants. These can, for instance, be selected from mono C6 to mono C16, preferably C6 to C10 N-alkyl or alkenyl ammonium surfactants wherein the remaining N positions are substituted by groups such as methyl, hydroxyethyl and hydroxypropyl.

Suitable zwitterionic surfactants include derivatives of secondary and tertiary amines, derivatives of heterocyclic secondary and tertiary amines, or derivatives of quaternary ammonium, quaternary phosphonium or tertiary sulphonium compounds. Betaine and sultaine surfactants are examples of zwitterionic surfactants.

Preferably the amount (by weight) of ionic surfactant based on the weight of binder (dry matter) is in the range 0.01 to 5%, preferably 0.1 to 4%.

The ionic surfactant is present in the mineral fibre product in amounts preferably from 0.01 to 3% (by weight), based on mineral fibre product, more preferably 0.05 to 1%, in particular, 0.1 to 0.8%.

The binder compositions used according to the present invention may additionally comprise one or more conventional binder additives. These include, for instance, curing accelerators such as, e.g. β-hydroxyalkylamides; the free acid and salt forms of phosphoric acid, hypophosphorous acid and phosphonic acid. Other strong acids such as boric acid, sulphuric acid, nitric acid and p-toluenesulphonic acid may also be used, either alone or in combination with the just-mentioned acids, in particular with phosphoric acid, hypophosphorous acid or phosphonic acid. Other suitable binder additives are ammonia; silane coupling agents such as γ-aminopropyltriethoxysilane; thermal stabilisers; UV stabilisers; plasticisers; anti-migration aids; coalescents; fillers and extenders such as clay, silicates and magnesium hydroxide; pigments such as titanium dioxide; flame retardants; corrosion inhibitors such as thiourea, urea; antifoaming agents; antioxidants; and others.

These binder additives and adjuvants may be used in conventional amounts generally not exceeding 20 wt. % of the binder solids. The amount of curing accelerator in the binder composition is generally between 0.05 and 5 wt. %, based on solids.

Once applied to the mineral fibres, the aqueous binder composition generally has a solids content of from 1 to 20 wt. % and a pH of 5 or greater.

The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

The Loss on Ignition (LOI) of the slab is a measure of the amount of organic material such as binder and wetting agent present. The LOI of a dry sample may be measured using section 16 of BS2972, 1989 (Method 1). The LOI is preferably at least 2.5%, preferably up to 5.3%, especially preferably 3-4%. In particular, the most preferred LOI is 3.5%. The preferred LOI for the slab offers good strength, but with the binder described above plant growth is not negatively affected despite the higher level of binder.

A higher LOI means the product is stronger. This means it is less likely to be damaged during use, especially during automated processing, for instance at a propagation facility. A further advantage of a higher binder content is that a smoother seed bed/hole can be formed in growth substrates such as plugs and blocks that are commonly provided with a seed hole. A smoother seed hole means that the seed is more likely to propagate from the ideal position in the seed bed/hole. The seed is additionally less likely to bounce out of the desired area, and/or be caught another part of the mineral fibre product. Accurate positioning of seeds leads to greater uniformity of the resulting crop which is advantageous for the propagator.

The diameter of the fibres within the slab 1 is preferably in the range of 2 to 10 μm, more preferably in the range of 3 to 8 μm, and particularly preferably in the range of 4 to 7 μm. These values may apply equally to the diameter of the fibres in the block 2 and/or plug 4.

In the preferred embodiment, the predominant fibre orientation of the first and second layers of the slab 1 is horizontal. This is found to reduce vertical non-uniformity in the water distribution. In this context, horizontal means parallel to the interfacial contact between the first and second layers. Alternative fibre orientations may be used in the first and/or second layers in other embodiments.

Figure 4:
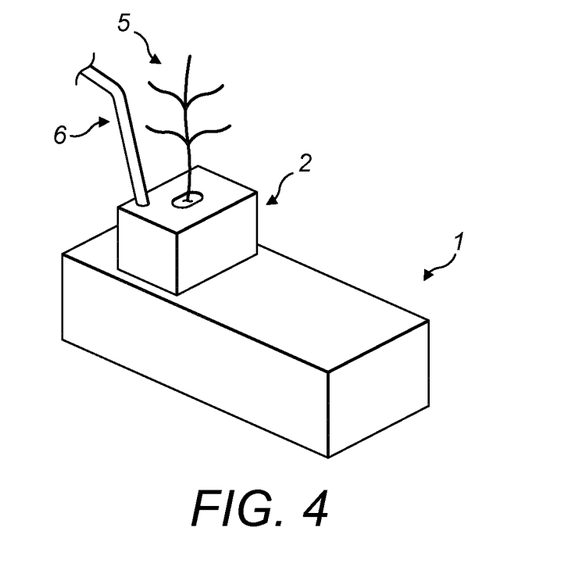
FIG. 4 illustrates a irrigation device in place next to the plant growth system of FIG. 2.

FIG. 4 shows a plant growth system comprising the slab 1, block 2 and plug 4 of FIGS. 1 to 3 and an irrigation device. The irrigation device 6 is arranged to provide a solution of water and nutrients to the system, either directly to the block or to the slab. In the preferred embodiment, the irrigation device is arranged to provide water and/or nutrient solution directly to the block 2. Since the block is disposed away from the drain hole 3 (as described above with reference to FIG. 2), solution from the irrigation device must pass more than 50% of the distance along the slab 1 before reaching the drain hole 3. In other preferred embodiments, the irrigation device may provide the water and nutrient solution to the slab 1 directly, but it is preferably arranged to do so either adjacent to the block or at a distal side of the block 2 relative to the drain hole 3.

It is found that an increased distance between the irrigation device 6 (i.e. the point at which the water and nutrient solution is provided to the system) and the drain hole 3 improves the nutrient refreshment efficiency of the system. This means that as solution is supplied using the irrigation device 6 it is not lost through the drain hole 3 but instead will replace existing liquid in the system. Accordingly, the total volume of the slab 1 is refreshed, rather than only a limited part of it.

The irrigation device 6 may be connected to separate nutrient and water reservoirs, and may be controlled to select the appropriate proportions of nutrients and water. Alternatively, a single combined nutrient and water reservoir may be provided such that the irrigation device provides liquid to the system having the same proportions of water and nutrients as are found in the reservoir.

Figure 5:
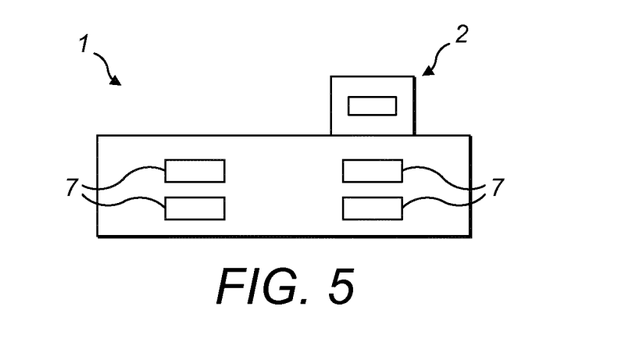
FIG. 5 illustrates the location of water and nutrient detectors on the plant growth system of FIG. 2.

The control of the irrigation device is preferably effected using a control system. The control system may control the irrigation devices providing nutrients and water to a plurality of plant growth systems each comprising a slab 1 upon which a plant-containing block 2 is placed. The control system is controlled on the basis of the detected water nutrient levels in one or more of the slabs. Additional control may be carried out on the basis of detected water content levels and/or temperatures in one or more slabs. The locations of the detectors 7 used to detect these levels in one embodiment are illustrated in FIG. 5. The detectors 7 may be of a known type, and will typically comprise a body portion together with one or more, usually three probes which extend from the body into the slab. The probes are typically made from stainless steel or another conductive material, and are used to measure the water content and/or electrical conductivity (EC) levels of the substrate by analysing the substrate's temperature, resistance and/or capacitance. The EC levels can be used to infer the nutrient level within the solution in the slab 1 as they reflect the ionic content of that solution.

Preferably, the EC level is maintained in the range 1.2 mS/cm to 8.5 mS/cm, more preferably in the range 2 mS/cm to 7 mS/cm. The preferred EC levels may be chosen according to crop type. If EC is too low (e.g. less than 1.2 mS/cm) the plant will starve for nutrients. If EC is in the range 2 mS/cm to 3.5 mS/cm, this will maximize production quantity. If EC is slightly higher this will result in better fruit quality (e.g. EC in the range 3.5 mS/cm to 5 mS/cm). If the EC is too high (for example, over 5 mS/cm for pepper and cucumbers or over 8.5 mS/cm for tomato) this will lead to fruit quality problems like Blossom End Rot. High EC implies that there will be high levels of Sodium and Chlorine in the substrate which can lead to a yield loss and need to discard the water from the greenhouse.

In prior art systems, the detectors 7 are placed on the upper surface of the slab 1, with the probes extending vertically through the slab. This approach is intended to provide a measurement which reflects the overall water or nutrient content across the vertical extent of the slab 1. However, in practice, such probes typically return results which are disproportionally influenced by the conditions in one or more areas of the slab 1, such as in the top portion of the slab. One reason this disparity can arise is because of variation in the EC level across the slab 1, which clearly affects the measured electrical properties such as resistance and/or capacitance from which, for example, the water content is calculated.

Further difficulties arise in prior art approaches due to the number of blocks 2 usually placed on a slab 1. It is often difficult to find positions on the slab 1 which are functionally equivalent for each block 2, particularly given the inherent asymmetry in the system caused by the location of the drain hole 3 at one end of the slab 1.

In the present invention, these difficulties are overcome. In particular, FIG. 5 shows that the detectors 7 are disposed on the side of the slab 1 (i.e. the body portion of the detector 7 is disposed against a vertical face of the slab and the probes extend horizontally). This approach is available because of the improved water content and EC distributions within the slab 1. Since these are substantially uniform in the slab 1 of the preferred embodiment, the horizontal extent of the probes provides an accurate reading.

Indeed, while the slab 1 of FIG. 5 is illustrated with a plurality of detectors 7, this is not the case in all preferred embodiments. The array of detectors 7 shown in FIG. 5 allows measurement of the water content distribution and EC distribution, and has been used to analyse the slab 1 characteristics, providing results such as those detailed below. However, in practice it is found that only a single detector 7 may be required. This detector 7 preferably comprises horizontally extending probes located at a position offset from the block towards the drain hole 3. In particular, in a preferred embodiment, the detector 7 is located at a distance of 200 mm from the drain hole 3 and 100 mm from the block 2. The positions of the block 2 and the detector 7 in this context are measured from their central points.

Figure 6:
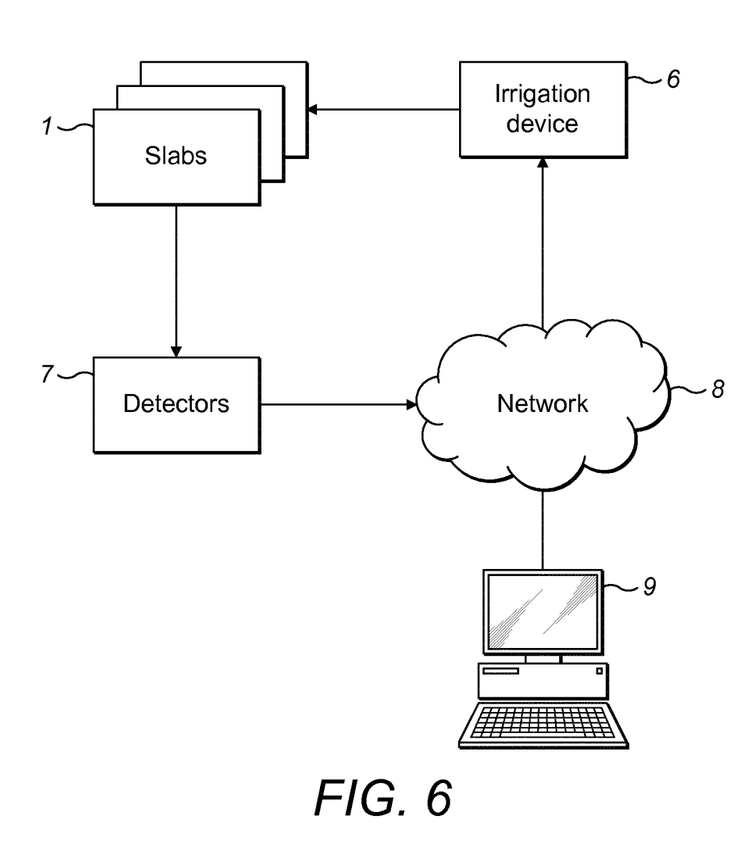
FIG. 6 shows schematically a plant growth control system comprises a plurality of the plant growth systems of FIG. 2.

The detectors 7 are used to control the quantity of water provided to the slab 1 by using a control system such as that illustrated in FIG. 6. The control system may also vary the concentration of nutrients within the solution provided by the irrigation devices 6 to the slabs 1. As can be seen from FIG. 6, the detectors 7 observe the data in the slabs 1, and communicate this across a network 8 to a control unit 9. The control unit then drives the irrigation devices (drippers) 6 across the network 8 in order to provide water and nutrients to the slabs 1. The control unit 9 can be programmed with a desired irrigation strategy (as discussed in more detail below) and can automatically ensure that the irrigation is carried out to control the nutrient levels in the slab 1 and may also control the water content levels in this manner. In this way, an automatic control of the irrigation process to provide a desired result is achieved.

Typically, each control system will comprise a large number of slabs 1. There may be detectors 7 placed on every slab 1, or there may be detectors placed on a selection of the slabs 1 to provide representative results. The detectors 1 are fixedly mounted to the slabs 1, in order that they can provide results to the control unit 9 at regular intervals. For example, the detectors may provide results at intervals of one minute, five minutes or another suitable time period. This allows the slabs 1 within the system to be constantly monitored so that they can be irrigated appropriately.

The irrigation devices 6 of the system may be controlled to apply a specific irrigation strategy. For example, such a strategy may comprise a number of distinct phases, designed to steer plants through generative and vegetative growth. As is understood in the art, generative growth refers to a type of growth in which the production of flowers/fruit is encouraged, while during vegetative growth the plant a higher proportion of leaves and other green elements are produced. Generative growth is encouraged when a plant has a relative lack of water and/or nutrients, while vegetative growth is encouraged by a plentiful supply of water and/or nutrients. Vegetative growth produces the higher increase in overall biomass of the plant, while generative growth increases the proportion of the growth which contributes to the production of fruit or flowers.

It has been known to take advantage of these different growth types by applying irrigation strategies during which the preferred water content level varies. According to such an irrigation strategy, the plant growth substrate is watered each day in an attempt to reach a desired water content level. The water content of the substrate is measured as a percentage of the water content of the substrate when the substrate is fully saturated. Thus, a value of 0% represents a dry substrate, while a value of 100% represents a fully saturated substrate.

Typically, an irrigation strategy of this type comprises a number of distinct stages. Firstly, prior to placing the block 2 on the slab 1, the slab 1 is typically saturated or near-saturated with water. This helps to ensure that when the block 2 is first placed on the slab 1, root growth into the slab 1 is encouraged. At this point, however, the grower is anxious to ensure that the plant 5 provides fruit as soon as possible. In order to achieve this, the grower aims to impart a "generative impulse" (i.e. an impulse to initiate generative growth). This is done during a first period of the irrigation strategy, by reducing the desired water content down to a minimum level before increasing it again. The principle is that the reduction of water content will encourage generative growth of the plant and thus the flowering of the plant leading to fruit at the earliest available time.

After the generative impulse is applied, the grower wishes to return the plant to a sustainable phase of predominantly vegetative growth in order to obtain leaves and plant structure which will support the now growing fruit. Thus, towards the end of the first period of the irrigation strategy, the desired water content is increased. The desired water content level is increased until it reaches a sustainable value at which it is held substantially constant during a second period of the irrigation strategy.

In the second period, more vegetative growth is encouraged due to the higher water content in the substrate. The second period corresponds broadly to the summer season, during which the relatively high amount of sunshine causes the plants to transpire at a greater rate. Accordingly, a relatively high proportion of water must be provided to the plants. It should be recognised that although growth may be steered towards vegetative growth during this period more than at other periods, fruit continues to grow, although the rate is controlled by this steering. As the season turns to autumn and then winter, the transpiration rate reduces. As a result, it is no longer necessary to maintain the same water content in the substrate. Moreover, there is at this stage a desire to encourage further fruit growth before the plant reaches the end of the cycle. For both these reasons, the irrigation strategy may comprise a third period in which the water content level is reduced. The rate of reduction is relatively gradual.

The reduction in water content during the third period encourages generative growth in the plant, and thereby extends the season during which useful fruit can be obtained from the plant.

So, irrigation strategies can be used to attempt to steer the plant between generative and vegetative growth states in order to increase the yield of fruit obtained from the plant. Conventionally, this process has been carried out by driving water content levels within the substrate to desired levels.

However, it is now recognised that such control is not sufficient to offer optimum growing conditions. In particular, the inventors of the present invention have identified a link between variation of water content levels and the nutrient levels within the slabs that can lead to sub-optimal results. In particular, reduction in water content levels can lead to increased nutrient levels which it has been discovered can inhibit plant growth. Accordingly, in the present embodiments, the level of water provided to the slab is controlled with a dependence on nutrient levels in order to avoid unwanted effects.

Figure 7A:
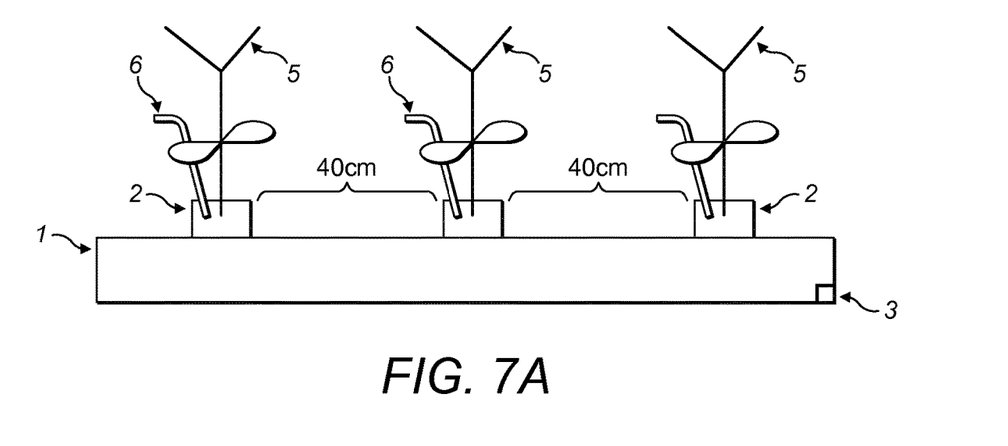
FIG. 7A illustrates a plant growth system according to a first example.
Figure 7B:
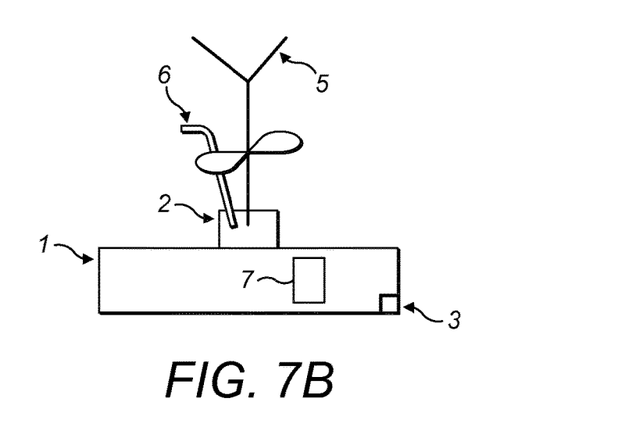
FIG. 7B illustrates a plant growth system according to invention second example.

The relationship between water content and nutrient levels can be understood with reference to FIGS. 7A, 7B, 8, 9 and 10, which demonstrate the results of a long term study into the effects of irrigation strategies. FIGS. 7A and 7B illustrate two plant growth substrates used for comparison. The plant growth substrates were used to grow tomato plants. As can be seen from the figures, each system comprised a single drain hole at one end of the slab. The first example system of FIG. 7A comprises three separate blocks placed on the upper surface of the slab, whereas the second example system of FIG. 7B comprises only a single block.

The first example slab of FIG. 7A has dimensions of 1330 mm*195 mm*75 mm (length*width*height) while the blocks have dimensions of 100 mm*100 mm*65 mm (length*width*height). The blocks are located at positions of 150 mm to 200 mm, 650 mm to 700 mm and 1100 to 1150 mm along the slab away from the drain hole (as measured from the centre of the block) and irrigation devices are provided for each block to deliver a water and nutrient solution to the block at a distal side of the block to the drain hole.

The second example slab of FIG. 7B has dimensions of 450 mm*150 mm*100 mm (length*width*height) while the block has dimensions of 100 mm*100 mm*65 mm (length*width*height). The block is located 300 mm along the slab away from the drain hole (as measured from the centre of the block) and an irrigation device is provided to deliver a water and nutrient solution to the block at a distal side of the block to the drain hole.

Figure 8:
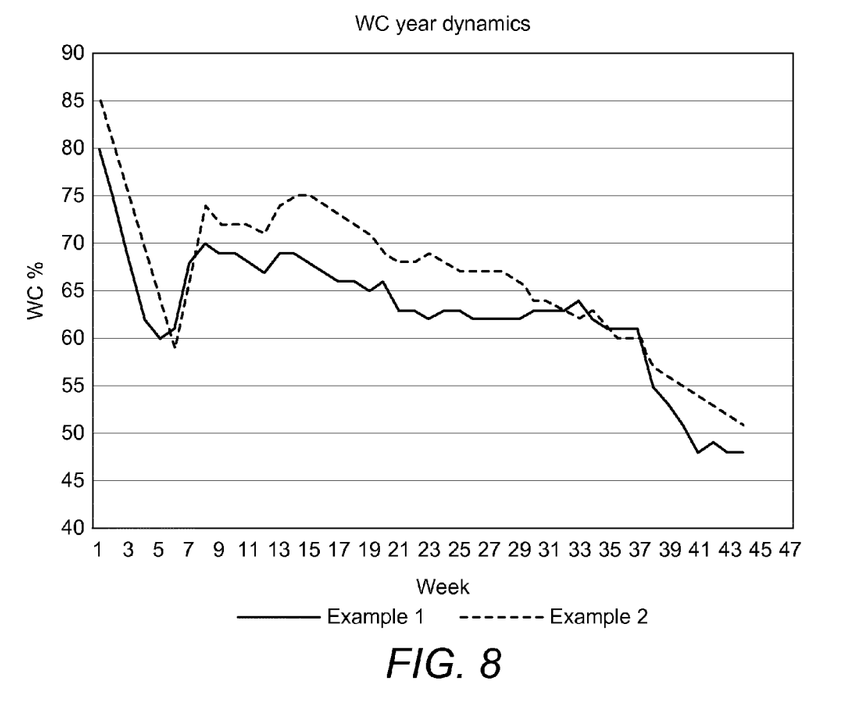
FIG. 8 illustrates an measured water content level in plant growth substrate of the first and second examples over a long term study.

FIG. 8 illustrates the measured water content in the first example slab (dashed line) and the second example slab (unbroken line) over the course of the study. It can be seen that during a first period the water content was reduced from an initial relatively high point, before subsequently increasing in line with the concept of a generative impulse as described above.

Figure 9:
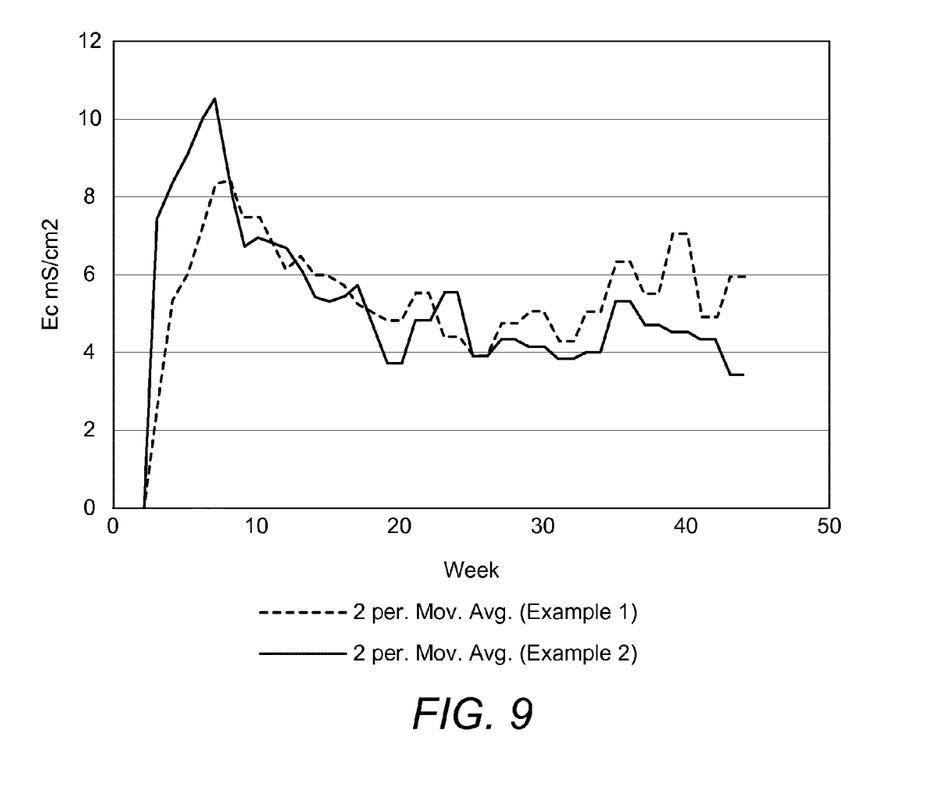
FIG. 9 illustrates the progression of EC level in a slab over a long term study.

FIG. 9 shows the measured EC level during the study for the first example substrate (dashed line) and the second example substrate (unbroken line). It will be recalled that the EC level represents in the nutrient level in the slab. It is noticeable that the EC level rapidly increases during the initial phase in which the generative impulse is applied to the plants. This increase leads to a peak EC level above that which is generally expected during later phases of the irrigation strategy.

Figure 10:
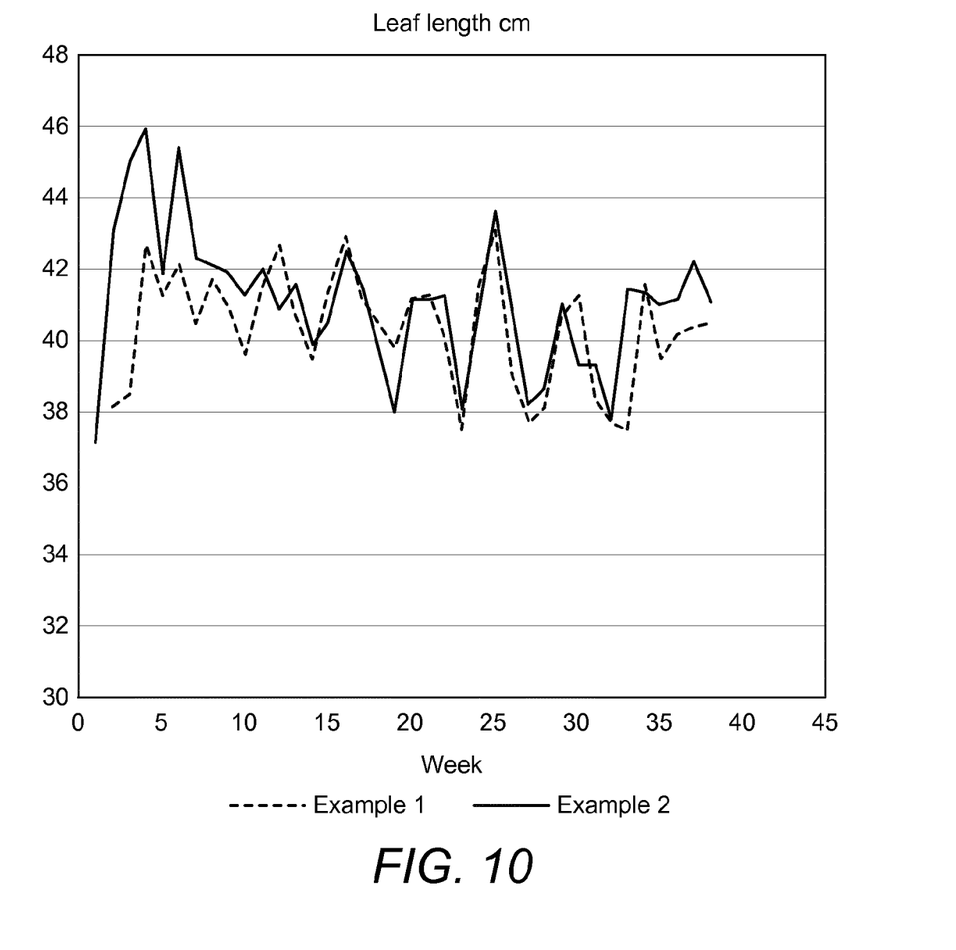
FIG. 10 illustrates the leaf length of plants during a long term study.

The link between EC level and effective plant growth is shown in FIG. 10 which shows the leaf length measured during the study for both the first example (dashed line) and second example (unbroken line). A clear drop in leaf length is observed at around 5 weeks in to the study. This drop is associated with the increased EC level shown during this period. It is thus understood that the EC level has an effect on the growth of the plant. Since the EC level has also been shown to be altered by changed in the water content level, it is desirable to control the water applied to the plant in such a way as to maintain the EC level within a desirable range. This contrasts with prior art approaches which may alter the concentration of nutrients to achieve a desired EC level but do not recognise that the overall quantity of water applied should be restrained by the desired nutrient content of the substrate.

Variations and modifications to the embodiments described above will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A plant growth system comprising:
   one or more plant growth substrates (1,2);
   wherein each substrate (1,2) comprises a man made vitrous fibre {MMVF} slab (1) and a MMVF block (2);
   wherein each MMVF slab (1) comprises a first upper layer of MMVF in interfacial contact with a second lower layer of MMVF, the first upper layer having a greater density than the second lower layer;
   one or more detectors (7) arranged to monitor nutrient levels of at least one of the plant growth substrates (1,2);
   at least one irrigation device (6) arranged to supply water to the plant growth substrates (1,2); and
   control means (9) connected to said detectors (7) and said at least one irrigation device (6),
   wherein the supply of water by the at least one irrigation device (6) is controlled by the control means (9) in accordance with an irrigation strategy such that the amount of water provided to the plant growth substrates is metered in dependence on the monitored nutrient levels within the plant growth substrates to control the water content level therein while maintaining nutrient content levels of the plant growth substrate within a desired range;
   wherein the one or more detectors (7) are arranged to determine the nutrient level from an electrical conductivity level of fluid in at least one plant growth substrate (1,2);
   wherein the electrical conductivity level is maintained within a predetermined range.

2. A plant growth system according to claim 1, wherein the one or more plant growth substrates (1,2) are man made vitrous fibres (MMVF) plant growth substrates.

3. A plant growth system according to claim 1, wherein the one or more detectors (7) are further arranged to monitor water content levels of at least one of the plant growth substrates (1,2), and the supply of water by the at least one irrigation device (6) is controlled by the control means (9) in dependence on the monitored water content levels.

4. A plant growth system according to claim 1, wherein the at least one irrigation device (6) is further arranged to provide nutrients to the plant growth substrates (1,2).

5. A plant growth system according to claim 4, wherein the supply of nutrients by the at least one irrigation device (6) is controlled by the control means (9) in dependence on the monitored nutrient levels.

6. A plant growth system according to claim 1, wherein the one or more detectors (7) are further arranged to monitor the distribution of at least one of water or nutrients within at least one of the plant growth substrates (1).

7. A plant growth system according to claim 1, wherein the one or more detectors (7) are further arranged to monitor the temperature of at least one of the plant growth substrates (1,2), and the supply of water by the at least one irrigation device (6) is further controlled by the control means (9) in dependence on the monitored temperature.

8. A plant growth system according to claim 1, wherein the slab has a volume in the range of 3 to 20 litres.

9. A plant growth system according to claim 8, wherein each plant growth substrate (1) further comprises a single MMVF plug (4) disposed within the MMVF block.

10. A plant growth system according to claim 1, wherein the first layer of MMVF has a density in the range 40 to 90 $kg/m^3$ and the second layer of MMVF has a density in the range 35 to 85 $kg^3$.

11. A plant growth system according to claim 1, wherein each MMVF slab (1) comprises a binding system comprising an organic binder selected from formaldehyde-free binders.

12. A plant growth system according to claim 1, wherein two or more detectors (7) are arranged to extend through a side wall of the slab (1) such that, in use, the nutrient levels are monitored at different heights of the slab (1).

13. A method for managing irrigation of a plant growth system comprising one or more man made vitrous fibres (MMVF) plant growth substrates (1,2), the method comprising:
   monitoring nutrient levels of at least one of the plant growth substrates;
   wherein monitoring nutrient levels comprises determining the nutrient content from an electrical conductivity of fluid in at least one plant growth substrate (1,2) using one or more detectors (7) arranged in the at least one of the plant growth substrates;
   wherein each substrate (1,2) comprises a MMVF slab (1) and a MMVF block (2);
   wherein each MMVF slab (1) comprises a first upper layer of MMVF in interfacial contact with a second lower layer of MMVF, the first upper layer having a greater density than the second lower layer;
   providing at least one irrigation device (6) arranged to supply water to the plant growth substrates (1,2); and
   providing a control means (9) connected to said detectors (7) and said at least one irrigation device (6),
   supplying water to the plant growth substrates (1,2) by the at least one irrigation device (6), wherein the supply of water is controlled by the control means (9) in accordance with an irrigation strategy such that the amount of water provided to the plant growth substrates is metered in dependence on the monitored nutrient levels within the plant growth substrates to control the water content level therein while maintaining nutrient content levels of the plant growth substrate within a desired range; and
   maintaining the electrical conductivity level within a predetermined range.

* * * * *